United States Patent
Shiota

(10) Patent No.: US 7,774,635 B2
(45) Date of Patent: Aug. 10, 2010

(54) MULTI-PROCESSING SYSTEM DISTRIBUTING WORKLOAD OPTIMALLY DURING OPERATION

(75) Inventor: Tetsuyoshi Shiota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1029 days.

(21) Appl. No.: 11/443,029

(22) Filed: May 31, 2006

(65) Prior Publication Data

US 2007/0192650 A1 Aug. 16, 2007

(30) Foreign Application Priority Data

Feb. 15, 2006 (JP) .............................. 2006-038584

(51) Int. Cl.
*G06F 1/00* (2006.01)
*G06F 1/04* (2006.01)
*G06F 1/14* (2006.01)

(52) U.S. Cl. ...................... 713/500; 713/501; 713/502; 718/105

(58) Field of Classification Search ................. 713/500, 713/501, 502; 718/105
See application file for complete search history.

(56) References Cited

U.S. PATENT DOCUMENTS

| | | | |
|---|---|---|---|
| 6,711,447 B1 * | 3/2004 | Saeed | 700/82 |
| 7,020,713 B1 * | 3/2006 | Shah et al. | 709/235 |
| 7,076,671 B2 * | 7/2006 | Espinoza-Ibarra et al. | 713/300 |
| 2002/0040447 A1 * | 4/2002 | Yeh et al. | 713/500 |
| 2004/0128575 A1 * | 7/2004 | Schmidt | 713/322 |
| 2005/0195181 A1 * | 9/2005 | Khodorkovsky | 345/211 |

FOREIGN PATENT DOCUMENTS

JP   2004-228417   8/2004

* cited by examiner

*Primary Examiner*—Thomas Lee
*Assistant Examiner*—Michael J Brown
(74) *Attorney, Agent, or Firm*—Fujitsu Patent Center

(57) ABSTRACT

A multi-processing system includes: a selecting unit that selects a clock frequency for each processor chips based on lot-to-lot variation thereof; a calculating unit that calculates chip performance of the processor chips operating at the clock frequencies; a judging unit that judges whether a total of chip performance of the processor chips is equal to or higher than a predetermined system performance; and a setting unit that sets the clock frequencies to the processor chips when the total is equal to or higher than the predetermined system performance.

13 Claims, 9 Drawing Sheets

FIG.3

|  | PROCESSOR CHIP 110A | PROCESSOR CHIP 110B |
|---|---|---|
| NOMINAL CLOCK FREQUENCY | 1GHz | 1GHz |
| ACTUAL CLOCK FREQUENCY | 2GHz (FAST) | 1GHz (SLOW) |
| SELECTED CLOCK FREQUENCY | 2GHz | 1GHz |

FIG.4A

| CHIP TEMPERATURE: 125°C | | | |
|---|---|---|---|
| LOT-TO-LOT VARIATION | CLOCK FREQUENCY [GHz] | POWER SOURCE VOLTAGE [V] | SUBSTRATE POTENTIAL [V] |
| FAST | 1.8 | 1.2 | 0 |
|  | 1.6 | 1.2 | -0.5 |
|  | 1.4 | 1.2 | -1 |
|  | 1.2 | 1.15 | -1 |
|  | 1 | 1.1 | -1 |
|  | 0.8 | 1.05 | -1 |
|  | 0.6 | 1 | -1 |
| TYPICAL | 1.4 | 1.2 | 0 |
|  | 1.2 | 1.2 | -0.5 |
|  | 1 | 1.15 | -0.5 |
|  | 0.8 | 1.1 | -0.5 |
|  | 0.6 | 1.05 | -0.5 |
| SLOW | 1 | 1.2 | 0 |
|  | 0.8 | 1.15 | 0 |
|  | 0.6 | 1.1 | 0 |

FIG.4B

| CHIP TEMPERATURE: 80°C | | | |
|---|---|---|---|
| LOT-TO-LOT VARIATION | CLOCK FREQUENCY [GHz] | POWER SOURCE VOLTAGE [V] | SUBSTRATE POTENTIAL [V] |
| FAST | 2 | 1.2 | 0 |
| | 1.8 | 1.2 | -0.5 |
| | 1.6 | 1.15 | -0.5 |
| | 1.4 | 1.1 | -0.5 |
| | 1.2 | 1.05 | -0.5 |
| | 1 | 1 | -0.5 |
| | 0.8 | 0.95 | -0.5 |
| TYPICAL | 1.6 | 1.2 | 0 |
| | 1.4 | 1.15 | 0 |
| | 1.2 | 1.1 | 0 |
| | 1 | 1.05 | 0 |
| | 0.8 | 1 | 0 |
| | 0.6 | 0.95 | 0 |
| SLOW | 1.2 | 1.2 | 0 |
| | 1 | 1.15 | 0 |
| | 0.8 | 1.1 | 0 |
| | 0.6 | 1.05 | 0 |

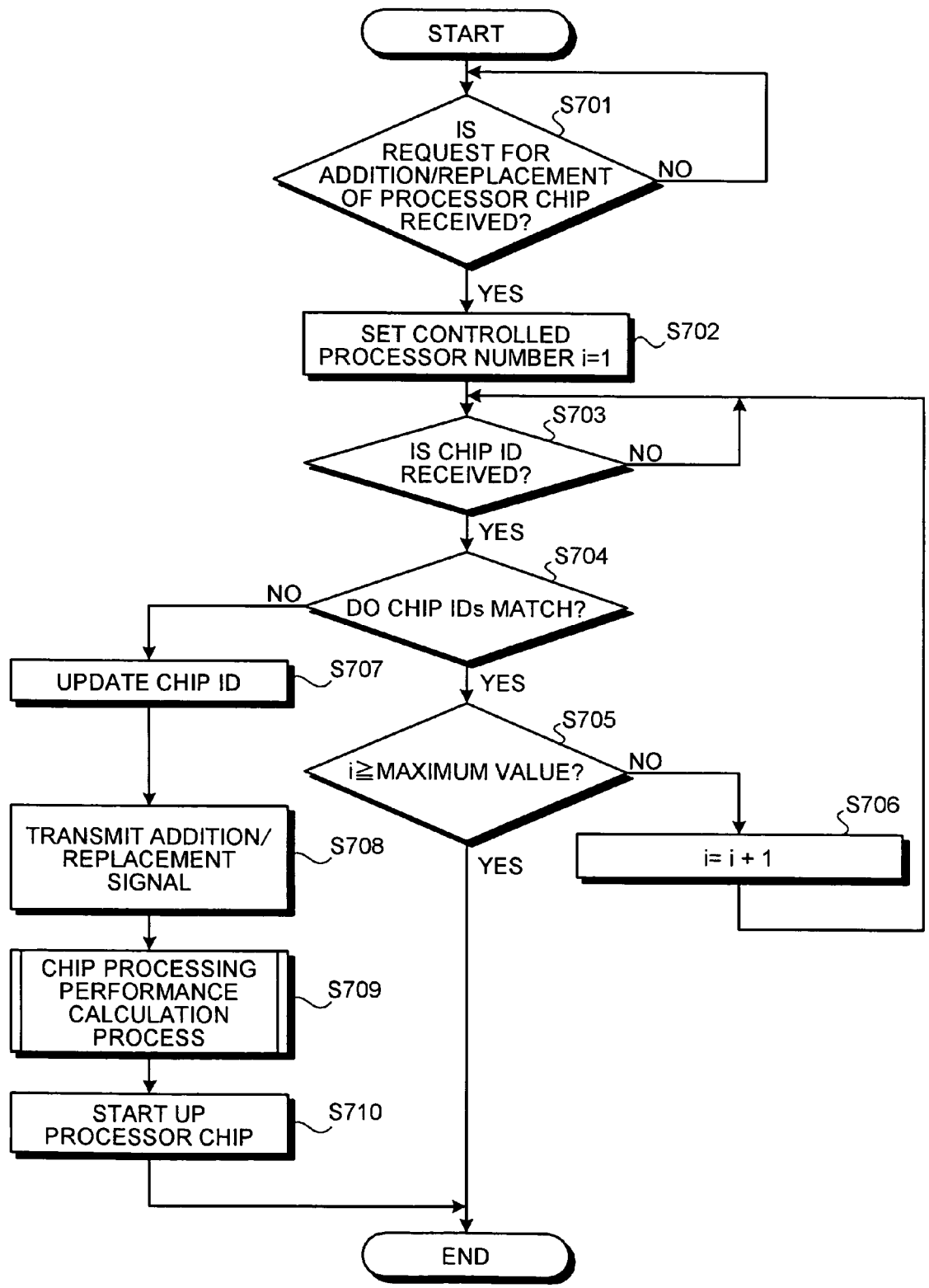

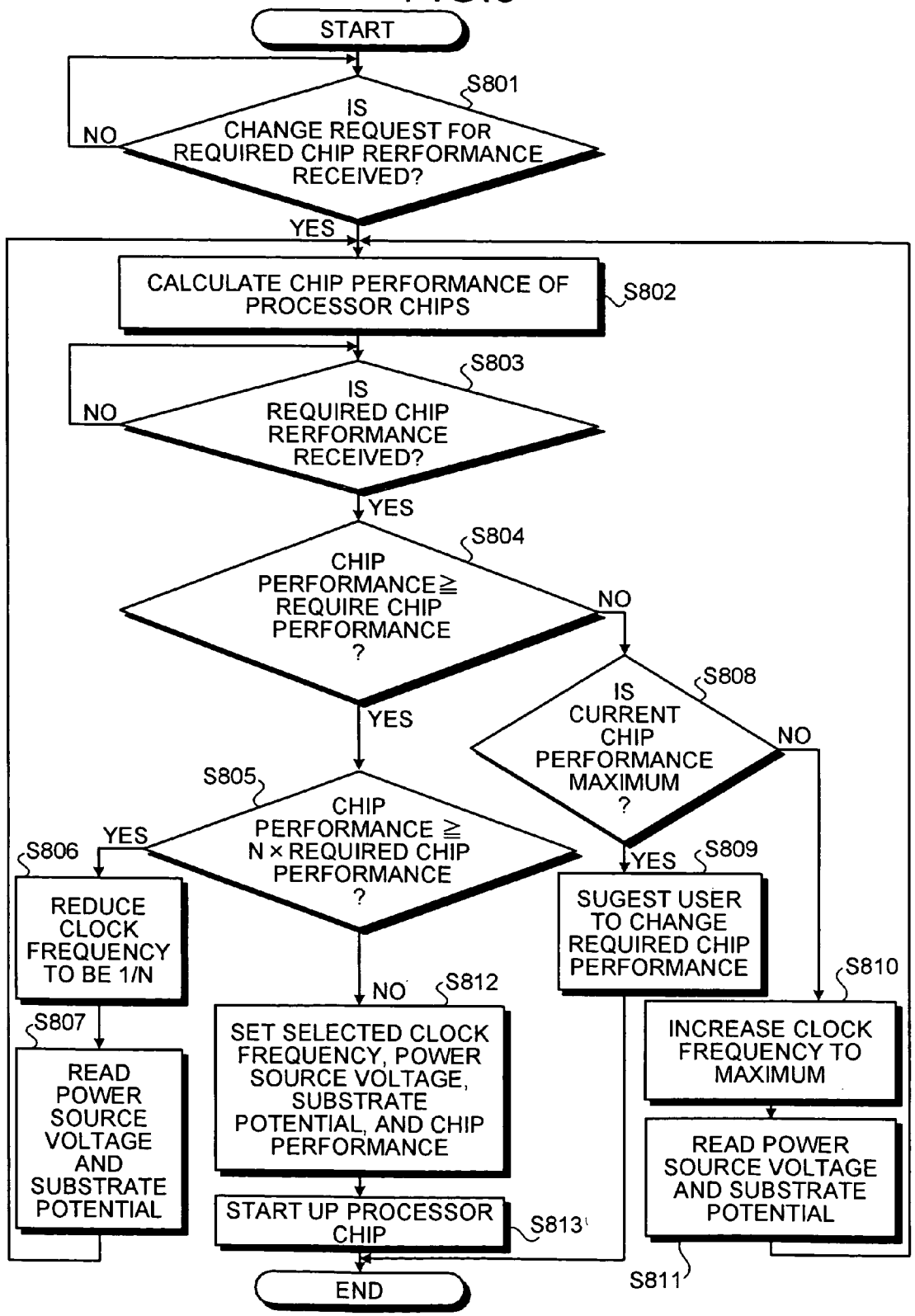

MULTI-PROCESSING SYSTEM DISTRIBUTING WORKLOAD OPTIMALLY DURING OPERATION

CROSS-REFERENCE TO RELATED APPLICATIONS

This application is based upon and claims the benefit of priority from the prior Japanese Patent Application No. 2006-038584, filed on Feb. 15, 2006, the entire contents of which are incorporated herein by reference.

BACKGROUND OF THE INVENTION

1. Field of the Invention

The present invention relates to a multi-processing system that distributes workload optimally among a plurality of processor chips without stopping the operation thereof.

2. Description of the Related Art

Conventionally, when processing of a large amount of information that can not be processed by the function of one (1) processor chip is executed, a multi-processing system that distributes the processing to a plurality of processors and causes the processors to execute the processing is utilized. In the multi-processing system, the distribution of the processing to be executed by the processor chips respectively is determined corresponding to clock frequency that indicates the processing performance of each processor chip.

FIG. 1 is a block diagram of the hardware configuration of a conventional multi-processing system. In FIG. 1, a conventional multi-processing system 900 is configured by connecting a distributed processing control chip 920 to a plurality of processor chips 910. Because the number of the processor chips is two (2) in FIG. 1, the chips are denoted respectively by "processor chip 910A" and "processor chip 910B".

Each of the processor chip 910A and the processor chip 910B includes a processor circuit 911 consisting of a clock unit 911a and a core unit 911b. The processor circuit generates a clock signal using the clock unit 911a. The generated clock signal is inputted into the core unit 911b. The core unit 911b executes processing distributed by a distributed processing control circuit 921 of the distributed processing control chip 920 based on the inputted clock signal.

Each of the processor chips 910 consists of a semiconductor circuit. Though the processor chips 910 are of the same type, the semiconductor circuit constituting each of the processor chips 910 may be a quick-operating circuit or a slow-operating circuit due to the performance unevenness caused during the manufacture thereof. For the semiconductor circuit constituting each of the processor chips 910, the operating speed thereof is varied according to the temperature. Therefore, the slowest-operating clock frequency in the frequencies estimated respectively for the chips is defined in the specifications such that the lot-to-lot variation and the range of the temperature variation are met.

In general, the specifications for the processor chips 910 is defined such that the specifications are unified specifications according to the type of the processor chips 910. Therefore, every processor chip 910 of the same type is regarded to follow uniquely the same specifications.

It is assumed that, for both of the processor chip 910A and the processor chip 910B, the specifications thereof define that the chips 910A, 910B are operable at the maximum clock frequency of 1 GHz. In this case, after the multi-processing system 900 has been energized, the clock frequency, the power source voltage, and the substrate potential are determined such that those items meet the specifications. That is, in the multi-processing system 900 shown in FIG. 1, the clock frequency of both of the processor chip 910A and the processor chip 910B is set at 1 GHz. Thereafter, processing is started in each of the processor chips 910.

In addition to the multi-processing system that utilizes as it is the clock frequency defined as the specifications thereof as described above, a technique that distributes a clock frequency autonomously according to processing has been developed. As an example, a circuit is disclosed (see, for example, Japanese Patent Application Laid-Open Publication No. 2004-228417), that includes a plurality of functional modules and a performance measuring circuit provided on a processor chip, and a memory table circuit (MTC) that stores information on the processor chip.

By configuring the circuit as described above, the operation of the processor chip is autonomously set by calculating the clock frequency, the power source voltage, and the substrate potential in a autonomous and distributed manner, from the performance of the processor chip measured by PMC and the values stored in PMC. Therefore, even in the case for functional modules for which the operation performance during operation is specified, the optimal clock frequency can be set according to the lot-to-lot variation of the processor chips.

However, even when the processor chips 910 are of the same type, the clock frequency of each of the chips 910 is varied due to the lot-to-lot variation and the temperature of each semiconductor circuit constituting each of the processor chips 910. Therefore, a problem has arisen that the processing performance of each of the processor chips 910A, 910B can not be utilized to the maximum thereof when the same type of the processor chips 910 are operated as following the same specifications uniquely.

For example, it is assumed that, though the processor chip 910A and the processor chip 910B are of the same type and the temperature of each semiconductor circuit is same, the processor chip 910A can operate at 2 GHz and the processor chip 910B can only operate up to 1 GHz due to the lot-to-lot variation.

In this case, both of the processor chip 910A and the processor chip 910B would conventionally be operated at 1 GHz according to the specifications. Representing the processing performance per 1 GHz of one (1) processor chip as "Pv", the performance of the multi-processing system 900 can be expressed in the following Equation (1).

$$(1\text{ GHz} + 1\text{ GHz}) \times Pv = 2Pv \tag{1}$$

However, the processor chip 910A has the actual capacity to operate at up to 2 GHz. Therefore, the processing performance of the multi-processing system 900 obtained when the chips are operated at the clock frequency according to the actual capacity thereof, can be expressed in the following Equation (2).

$$(2\text{ GHz} + 1\text{ GHz}) \times Pv = 3Pv \tag{2}$$

Comparing the above Equation (1) to Equation (2), only two thirds (⅔) of the processing performance within the actual capacity can be utilized in the conventional technique.

In the conventional multi-processing system, the ratio between the required processing amounts that the chip can most quickly process can not be specified because the processing performance of the processor chips 910 can not be recognized. Therefore, the required processing amounts respectively for the processor chips 910A, 910B have to be distributed in the ratio of 1:1 at the clock frequency defined in the specification. Therefore, a problem has arisen that processing distribution corresponding to the processing performance of each of the processor chips 910A, 910B can not be realized.

When the processor chips 910 are replaced, the distribution has to be executed according to clock frequencies defined in the specifications because the processing performance of each of the newly mounted processor chips can not be recognized.

The conventional technique in Japanese Patent Application Laid-Open Publication No. 2004-228417 described above has a problem that the processing for the entire system can not be distributed optimally because the function is of autonomous-distributing type.

SUMMARY OF THE INVENTION

It is an object of the present invention to at least solve the problems in the conventional technology.

A multi-processing system according to an aspect of the present invention includes a plurality of processor chips, namely, at least a first processor chip and a second processor chip operating at a first clock frequency and a second clock frequency, respectively. The multi-processing system further includes: an acquiring unit that acquires, from the first processor chip and the second processor chip, first information on lot-to-lot variation of the first processor chip and second information on lot-to-lot variation of the second processor chip, respectively; a selecting unit that selects a first selected clock frequency and a second selected clock frequency based on the first information and the second information, respectively; a chip performance calculating unit that calculates a first chip performance of the first processor chip operating at the first selected clock frequency and a second chip performance of the second processor chip operating at the second selected clock frequency, respectively; a system performance judging unit that judges whether a total of chip performance of the processor chips is equal to or higher than a predetermined system performance required for the multi-processing system; and a setting unit that sets the first selected clock frequency and the second selected clock frequency as the first clock frequency and the second clock frequency, respectively, when the total is equal to or higher than the predetermined system performance.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a diagram showing the characteristics of the processor chips;

FIGS. 4A and 4B are diagrams of lot-to-lot variation vs. clock frequency tables;

FIG. 8 is a flowchart of an addition or replacement process of the processor chips executed by the multi-processing system; and FIG. 9 is a flowchart of an optimization process executed by the multi-processing system after the optimization process shown in FIG. 6.

DETAILED DESCRIPTION OF THE PREFERRED EMBODIMENTS

Exemplary embodiments of the present invention will be described in detail below with reference to the accompanying drawings. In the embodiments, a job requested from a host system (for example, an information processing apparatus incorporating the multi-processing system 100) is distributed to and executed by a plurality of processor chips in a multi-processing system such that a required system performance specified by the host system is achieved.

More specifically, prior to the start of operation (for example, when an information processing apparatus incorporating the multi-processing system is turned on), the processing performance of each of the processor chips in the multi-processing system is set such that the total thereof exceeds the required system performance. After the setting is completed for all of the processor chips, the operation of the multi-processor is started.

Figure 1:
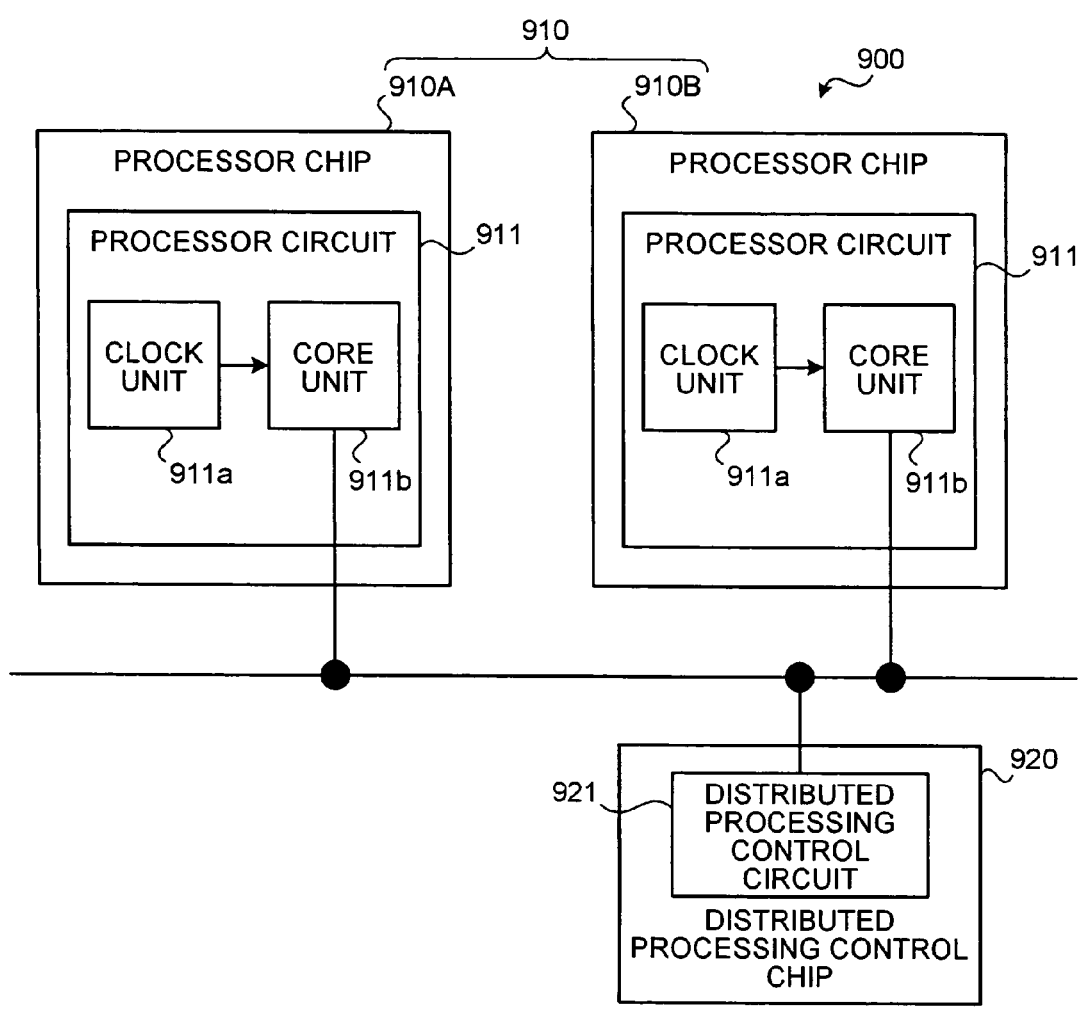
FIG. 1 is a block diagram showing the hardware configuration of a conventional multi-processing system.
Figure 2:
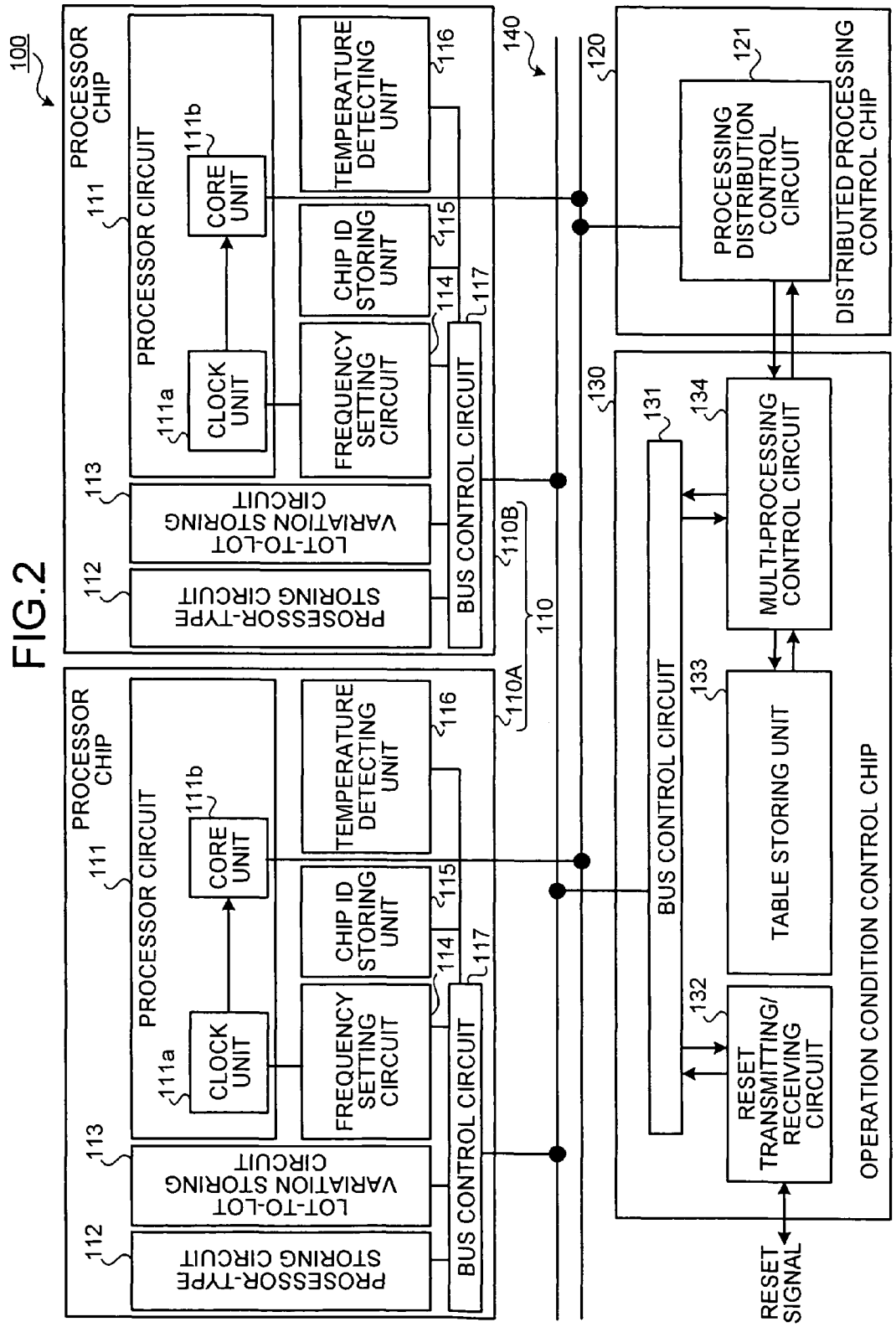
FIG. 2 is a block diagram showing the hardware configuration of a multi-processing system according to the present invention.

FIG. 2 is a block diagram showing the hardware configuration of the multi-processing system according to the present invention. A multi-processing system 100 is configured by connecting a plurality of processor chips 110 (a processor chips 110A and 110B) having the same function and structure, a distributed processing control chip 120, and an operation condition control chip 130 by a bus 140. The processor chips 110 can be replaced, increased or decreased according to the amount of information to be processed or the performance required by the user or the host system.

The processor chips 110A and 110B respectively includes a processor circuit 111, a processor-type storing circuit 112, a lot-to-lot variation storing circuit 113, a frequency setting circuit 114, a chip ID storing unit 115, a temperature detecting unit 116, and a bus control circuit 117.

The processor circuit 111 includes a clock unit 111a and a core unit 111b. The clock unit 111a generates and outputs a clock signal of a predetermined frequency to the core unit 111b. The period of the clock signal is adjusted such that the frequency thereof becomes a set value. The core unit 111b processes information distributed to the processor chip 110 at the clock frequency (the frequency of the clock signal) input from the clock unit 111a.

The processor-type storing circuit 112 stores the type of the processor chip 110, which is transmitted to the operation condition control chip 130 through the bus control circuit 117. The type is information indicating the specification of the processor circuit 111, such as serial number or item number corresponding one-to-one to the model number of the processor chip 110, and therefore corresponding one-to-one to the clock frequency defined in the specification of the processor chip 110 (hereinafter, "nominal clock frequency").

The lot-to-lot variation storing circuit 113 stores the lot-to-lot variation in the clock frequency of the processor chip 110. The lot-to-lot variation is information on the clock frequency corresponding to the maximum performance of the processor circuit 111 when actually processing the distributed information (hereinafter, "actual clock frequency"), and/or information on the difference between the nominal clock frequency and the actual clock frequency. For example, the difference is classified into three categories of "Fast", "Typical", and "Slow" through a comparison against predetermined threshold values, and the category of the difference and the actual clock frequency are stored in the lot-to-lot variation storing circuit 113. The actual clock frequency is detected through, for example, monitoring the clock unit 111*a*.

The lot-to-lot variation is transmitted to the operation condition control chip 130 through the bus control circuit 117, to calculate the optimal clock frequency at which the processor chip 110 can operate with the optimal processing performance (hereinafter, "selected clock frequency").

The frequency setting circuit 114 stores the clock frequency, the power source voltage, and the substrate potential of the clock signal, which are transmitted from the operation condition control chip 130 through the bus control circuit 117. The processor chip 110 operates on the clock signal having the clock frequency, the power source voltage, and the substrate potential set in the frequency setting circuit 114.

The chip ID storing unit 115 stores the chip ID of the processor chip 110. The chip ID is an identifier of the processor chip 110, such as the serial number thereof. The chip ID stored in the chip ID storing unit 115 is monitored, by the operation condition controlling chip 130, to detect any change (for example, replacement) of the processor chip 110.

The temperature detecting unit 116 detects the temperature of the processor chip 110, which is transmitted to the operation condition control chip 130 through the bus control circuit 117. The temperature of the processor chip 110 depends on various factors such as the operation conditions, the use environment, the performance of the cooling mechanism in the information processing apparatus, etc. Therefore, the temperature detecting unit 116 constantly monitors the temperature of the processor chip 110.

The location of the temperature detecting unit 116 is not limited to the interior of each of the processor chips 110 as shown in FIG. 2, and may be outside of the processor chip 110. For example, a plurality of temperature detecting units 116 may be provided for each of the processor chips 110. Alternatively, a common temperature detecting unit 116 may be provided to detect the temperature of each of the processor chips 110 separately, and to transmit the detected temperature with the chip ID of the processor chip 110 to the operation condition controlling chip 130.

The bus control circuit 117 controls the transfer of various types of information. For example, the bus control circuit 117 outputs information from each component of the processor chips 110 to the distributed processing control chip 120, the operation condition control chip 130, and other external functional units, and vice versa.

FIG. 3 is a diagram showing the characteristics of each of the processor chips 110, more specifically, the nominal clock frequency determined by the type of the processor chips 110 stored in the processor-type storing circuit 112; the actual clock frequency stored in the lot-to-lot variation storing circuit 113; and the selected clock frequency set in the frequency setting circuit 114 by the operation condition control chip 130.

Referring back to FIG. 2, the distributed processing control chip 120 includes a processing distribution control circuit 121 that receives the required system performance from the user or the host system. The required system performance is the processing performance to be achieved by the processor chips 110 in the multi-processing system 100. The required system performance is represented by a×Pv, where "a" is a predetermined factor, and "PV" is the processing performance of one processor chip 100 per 1 GHz.

The required system performance is output to the operation condition control chip 130 that executes setting processing of system performance based on the required system performance. The system performance is the total of the processing performance of each of the processor chips 110 (hereinafter, "chip performance"). For example, when the actual clock frequencies of the processor chips 110A and 110B are 2 GHz and 1 GHz, respectively, the chip performance of the processor chips 110A and 110B are 2 Pv and 1 Pv, respectively. Therefore, the system performance of the multi-processing system 100 is 3 Pv when operating at the maximum capacity thereof.

The distributed processing control chip 120 also receives, from the operation condition control chip 130, a request for changing required chip performance (more specifically, reducing the required chip performance by a predetermined amount) when the chip performance calculated by the operation condition control chip 130 based on the actual clock frequency is less than the required chip performance.

The operation condition control chip 130 includes a bus control circuit 131, a reset transmitting/receiving circuit 132, a table storing unit 133, and a multi-processing control circuit 134.

The bus control circuit 131 controls the transfer of various types of information. For example, the bus control circuit 131 outputs information from the circuits 111 to 117 of each of the processor chips 110 to the circuits 132 and 134 of the operation condition control chip 130, and vice versa.

The reset transmitting/receiving circuit 132 receives a reset signal from the host system, and stops the operation of the entire multi-processing system 100 to execute re-setting processing of each of the processor chips 110 again, which is similar to the setting processing executed when the system is turned on. When the required chip performance or the configuration of the processor chips 110 needs to be changed during the setting of each of the processor chips 110, the reset transmitting/receiving circuit 132 informs the user or the host system of necessary information. When the circuit 132 has received a request for addition or replacement of processor chip or a request for changing the required performance from the user or the host system, the circuit 132 transmits the requests to the distributed processing control chip 120.

The table storing unit 133 stores a lot-to-lot variation vs. clock frequency table that retains, for each of the categories of the difference between the nominal frequency and the actual frequency, a plural sets of a clock frequency, a power source voltage and a substrate potential when the processor chips 110 operates at the clock frequency. The information retained in the table is read by the multi-processing control circuit 134.

FIGS. 4A and 4B are explanatory diagrams of the lot-to-lot variation vs. clock frequency table. A lot-to-lot variation vs. clock frequency table 310 shown in FIG. 4A is used when the temperature of a processor chip is 125° C. (A range of ±k° C. may by accepted and k may be set arbitrary). A lot-to-lot variation vs. clock frequency table 320 shown in FIG. 4B is used when the temperature of a processor chip is 80° C. (A range of ±k° C. may by accepted and k may be set arbitrary).

For example, when the temperature of the processor chip 110 is 125° C. and the lot-to-lot variation thereof is "Fast", a clock frequency of 1.4 GHz, a power source voltage of 1.2V, and a substrate potential of −1V are read from the lot-to-lot variation vs. clock frequency table 310 shown in FIG. 4A, from among seven combinations of clock frequency, power source voltage, and substrate potential corresponding to the lot-to-lot variation of "Fast". For maximizing the processing performance of the processor chip 110, a combination in which the clock frequency is the maximum, more specifically, 1.8 GHz is selected for the clock frequency, 1.2V is selected for the power source voltage, and 0V is selected for the substrate potential.

The multi-processing control circuit 134 controls the setting of each operation condition executed by the operation condition control chip 130. For example, the circuit 134 reads the lot-to-lot vs. clock frequency tables 310 and 320 in the table storing unit 133, determines the selected clock frequency of each of the processor chips 110, and determines the power source voltage and the substrate potential corresponding to the selected clock frequency. The circuit 134 also calculates the chip performance and the system performance described above. The circuit 134 also compares the required chip performance with the chip performance, compares the required system performance with the system performance, and outputs the results of the comparisons to the processing distribution control chip 120.

The required chip performance is chip performance required to each of the processor chips 110 and is set by the distributed processing control chip 120 according to the instruction from the user. The total of required chip performance of the processor chips 110 is the required system performance described above. The detailed processing of the multi-processing control circuit 134 will be described referring to flowcharts that will be described later.

Figure 5:
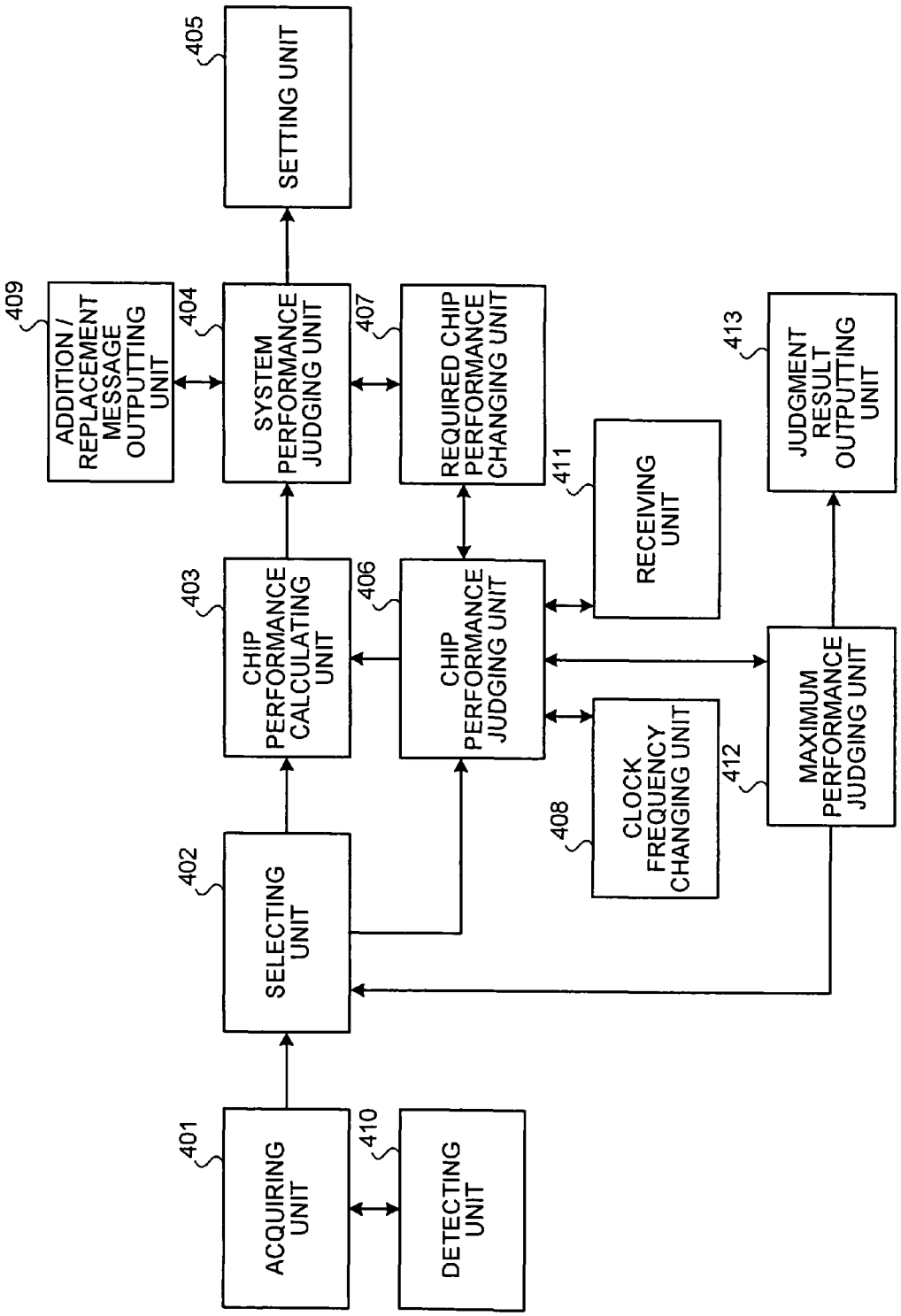
FIG. 5 is a block diagram showing the functional configuration of the multi-processing system.

FIG. 5 is a block diagram showing the functional configuration of the multi-processing system according to the present invention. The multi-processing system 100 shown in FIG. 2 includes an acquiring unit 401, a selecting unit 402, a chip performance calculating unit 403, a system performance judging unit 404, a setting unit 405, a chip performance judging unit 406, a required chip performance changing unit 407, a clock frequency changing unit 408, an addition/replacement message outputting unit 409, a detecting unit 410, a receiving unit 411, a maximum performance judging unit 412, and a judgment result outputting unit 413.

The acquiring unit 401 acquires information on the lot-to-lot variation of the processor chips 110 from the processor chips 110. The information on the lot-to-lot variation includes, for example, the nominal clock frequency, the actual clock frequency, the category of the difference between the nominal clock frequency and the actual clock frequency ("Fast", "Typical", "Slow", etc.), the temperature, the type, the chip ID, etc.

The acquiring unit 401 acquires the information on the lot-to-lot variation of a new processor chip 110 when the processor chip 110 is added in response to the message output from the addition/replacement message outputting unit 409. The acquiring unit 401 also acquires information on the lot-to-lot variation of a new processor chip 110 when the detecting unit 410 has detected that any one of the processor chips 110 has been replaced with the new one. The acquiring unit 401 is realized by the bus control circuit 131 in the operation condition control chip 130 shown in FIG. 2.

The selecting unit 402 selects a clock frequencies based on the information on the lot-to-lot variation acquired by the acquiring unit 401. More specifically, the selecting unit 402 selects one of the lot-to-lot variation vs. clock frequency tables in the table storing unit 133 based on the temperature included in the information on the lot-to-lot variation, and reads a clock frequency, a power source voltage, and a substrate potential corresponding to the category of the difference ("Fast", "Typical", "Slow", etc.) included in the information on the lot-to-lot variation from the selected lot-to-lot variation vs. clock frequency table.

The clock frequency that has been selected by the selecting unit 402 is the selected clock frequency described above. For maximizing the processing performance of the processor chip 110, a combination in which the clock frequency is the maximum is selected. The selecting unit 402 is realized by the multi-processing control circuit 134 in the operation condition control chip 130 shown in FIG. 2.

The chip performance calculating unit 403 calculates the chip performance for the processor chip 110 operating at the selected clock frequency selected by the selecting unit 402. More specifically, for example, the chip performance of the processor chip 100 is 2 Pv when the selected clock frequency is 2 GHz.

The chip performance calculating unit 403 also calculates the chip performance again when the selected clock frequency has been changed by the clock frequency changing unit 407. More specifically, when the selected clock frequency has been changed from 2 GHz to 1.8 GHz, the chip performance of the processor chip 100 becomes 1.8 Pv. The chip performance calculating unit 403 is realized by the multi-processing control circuit 134 in the operation condition control chip 130 shown in FIG. 2.

The system performance judging unit 404 judges whether or not the total of the chip performance calculated by the chip performance calculating unit 403 is equal to or higher than the required system performance. More specifically, the unit 404 compares the system performance, which is the total of the chip performance of each of the processor chips 110, with the required system performance received from the distributed processing control chip 120.

The system performance judgment unit 404 also judges whether or not the system performance is equal to or higher than the required system performance based on the judgment of the chip performance judging unit 406.

When the system performance is equal to or higher than the required system performance, the processor chips 110 as a whole achieve the required system performance. When the system performance is lower than the required system performance, after an addition or replacement of the processor chip 110 to improve the system performance, the clock frequency, the power source voltage, and the substrate potential are read again for each of the processor chips 110.

When the system performance is equal to or higher than the required system performance, the system performance judging unit 404 further judges whether or not the system performance is within M (M>1) times as high as the required system performance.

"M" may be set to a default value that is set considering the general performance balance at the shipping of the multi-processing system 100, or may be set individually according to the individual use. For example, the value of "M" is set to be small when the system is used in an information processing apparatus that does not require any processing at a speed higher than necessary.

When the system performance is higher than M times as high as the required system performance, the power consumption may be reduced by lowering the selected clock frequency. Therefore, the required chip performance is reviewed by the distributed processing control chip 120.

When the system performance is within M times as high as the required system performance, then-selected clock frequency, then-power source voltage, and then-substrate potential of each of the processor chips 110 are transmitted to the processor chips 110. The system performance judging unit 404 is realized by the multi-processing control circuit 134 in the operation condition control chip 130 shown in FIG. 2.

The setting unit 405 sets the clock frequency of the processor chip 110 at the selected clock frequency based on the result of the judgment of the system performance judging unit 404. More specifically, the setting unit 405 transmits the selected clock frequency, power source voltage, and substrate potential of the processor chip 110 to the frequency setting unit 114 in the processor chip 110 to be set as the operating clock frequency, power source voltage, and substrate potential.

Thereby, the processor chip 110 operates at the clock frequency, the power source voltage, and the substrate potential that have been set and the processing distribution of the multi-processing system 100 is optimized. The setting unit 405 is realized by the frequency setting circuit 114 in each of the processor chips 130 shown in FIG. 2.

The chip performance judging unit 406 judges, for one of the processor chips 110 selected from the processor chips 110 (for example, the processor chip 110A operating at the selected clock frequency), whether or not the chip performance thereof is equal to or higher than the required chip performance thereof. More specifically, when the chip performance is calculated for the processor chip 100A, the chip performance judging unit 406 reads the required chip performance of the processor chip 110A from the distributed processing control chip 210, and compares the read performance with the calculated performance.

The chip performance judging unit 406 also judges whether or not the chip performance is equal to or higher than the required chip performance when it has been changed by the required chip performance changing unit 407.

When the chip performance is equal to or higher than the required chip performance, the processor chip 110A achieves the required chip performance. When the chip performance is lower than the required chip performance, after an addition or replacement of the processor chip 110 to improve the system performance, the clock frequency, the power source voltage, and the substrate potential are read again for each of the processor chips 110.

When the chip performance is equal to or higher than the required chip performance, the chip performance judging unit 406 further judges whether or not the chip performance is equal to or higher than N (N>1) times as high as the required chip performance. The same step as above is taken when a new required chip performance is received by the receiving unit 411 that will be described later, after the setting by the setting unit 405.

"N" may be set to a default value that is set considering the general performance balance at the shipping of the multi-processing system 100, or may be set individually according to the individual use. For example, the value of "N" is set to be small when the system is used in an information processing apparatus that does not require any processing at a speed higher than necessary.

When the chip performance is higher than N times as high as the required chip performance, the selected clock frequency is multiplied by 1/N, the power source voltage and the substrate potential are read again, and the chip performance is re-calculated.

By repeating the above, a clock frequency, a power source voltage, and a substrate potential can be obtained which optimize the chip performance of each of the processor chips 110 in a range from one time to 1/N times as high as the required chip performance. The chip performance judging unit 406 is realized by the multi-processing control circuit 134 in the operation condition control chip 130 shown in FIG. 2.

The required chip performance changing unit 407 reduces the required chip performance by a predetermined amount when the chip performance of the processor chip 110 has been judged by the chip performance judging unit 406 to be lower than the required chip performance.

The required chip performance changing unit 407 also reduces the required chip performance by a predetermined amount when the system performance has been judged by the system performance judging unit 404 to be more than M (M>1) times as high as the required system performance. The amount to be changed by the required chip performance changing unit 407 may be changed by the user or the host system for every change without limiting to the predetermined amount. The required chip performance changing unit 407 is realized by the distributed processing control chip 120 shown in FIG. 2.

The clock frequency changing unit 408 changes the selected clock frequency to 1/N thereof when the chip performance has been judged to be equal to or higher than N times as high as the required chip performance. The required chip performance may be reduced in any way as long as the selected clock frequency after the change is not equal to or lower than the nominal clock frequency. The clock frequency changing unit 408 is realized by the table storing unit 133 and the multi-processing control circuit 134 shown in FIG. 2.

The addition/replacement message outputting unit 409 outputs a message to suggests an addition or replacement of the processor chip to the user, when the total of the chip performance of the processor chips 110 has been judged to be lower than the required system performance by the system performance judging unit 404. The outputting of the message may be executed, for example, in the form of a message displayed on a screen or the form of sound outputted. The addition/replacement message outputting unit 409 is realized by an outputting circuit (not shown) connected with the bus 140 show in FIG. 2

The detecting unit 410 detects the replacement of the processor chip 110 when the clock frequency of the processor chips 110 has been set at the selected clock frequency by the setting unit 405. More specifically, the detecting unit 410 monitors the chip ID stored in the chip ID storing unit 115 of each of the processor chips 110 at an interval of a predetermined time period, and detects the replacement when the chip ID acquired at the previous time does not coincide with the chip ID acquired at this time. The detecting unit 410 is realized by the multi-processing control circuit shown in FIG. 2.

The receiving unit 411 receives new required chip performance for each of the processor chips 110 when the clock frequency thereof has been set at the selected clock frequency by the setting unit 405. For example, the receiving unit 411 receives new required chip performance from the distributed processing controlling unit 120 when the required chip performance is to be changed after the setting by the setting unit 405. The receiving unit 411 is realized by the bus control circuit 131 or the multi-processing control circuit 134 shown in FIG. 2.

The maximum performance judging unit 412 judges whether or not the current chip performance of each of the processor chips 110 is the maximum performance. The maximum performance is chip performance corresponding to an actual clock frequency. For example, when the actual clock frequency of the processor chip 110A is 2 GHz, the maximum performance of the processor chip 110A is 2 Pv.

More specifically, the maximum performance judging unit 412 makes judgment when the chip performance of any one of the processor chips 110 has been judged by the chip performance judging unit 406 to be lower than the new required chip performance received by the receiving unit 411. That is, when the current chip performance is lower than the new required chip performance, the unit 412 judges whether or not the current clock frequency is maximum in for the processor chip 110.

When the chip performance of the processor chip 110 has been judged not to be the maximum, the selecting unit 402 selects the maximum clock frequency for the processing chip 110. The chip performance calculating unit 403 calculates the chip performance of the processor chip 110 based on the maximum clock frequency selected by the clock frequency changing unit 408. Thus, the chip performance is calculated again by maximizing the selected clock frequency once and reading the power source voltage and the substrate potential corresponding to the maximum clock frequency. Thus, even when the job amount is changed during the operation of the multi-processing system 100, the selected clock frequency can be automatically adjusted and set at an optimal value. The maximum performance judging unit 412 is realized by the multi-processing control circuit 134 shown in FIG. 2.

The judgment result outputting unit 413 outputs the result of the judgment of the maximum performance judgment unit 412. For example, when the current chip performance of one of the processor chips 110 has been judged to be the maximum performance, the unit 413 outputs a message for a review on new required chip performance. The judgment result outputting unit 413 realizes the function thereof using an outputting circuit (not shown) connected with the bus 140 shown in FIG. 2.

Figure 6:
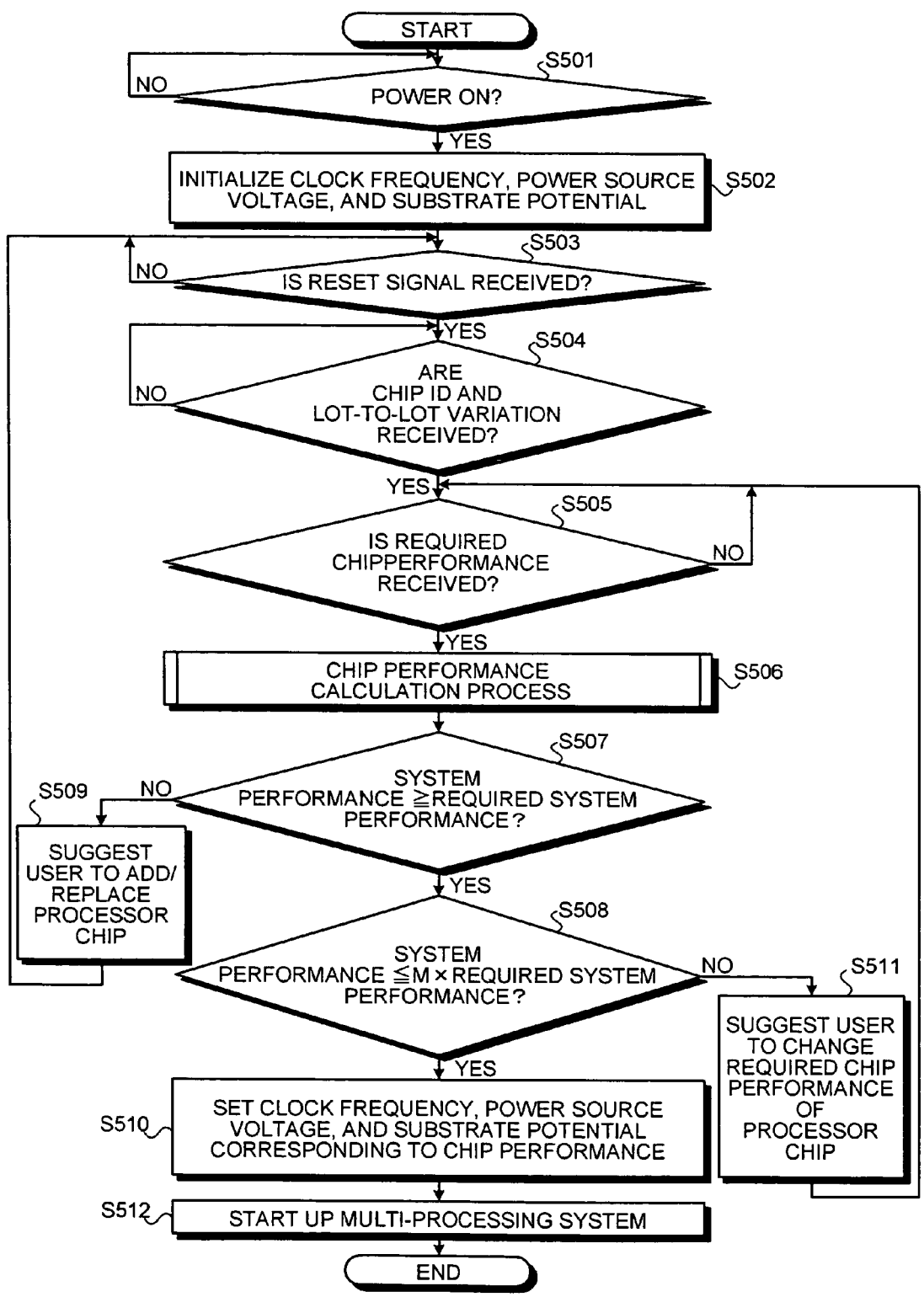
FIG. 6 is a flowchart of an optimization process executed by the multi-processing system.

FIG. 6 is a flowchart of an optimization process executed by the multi-processing system according to the present invention. When the information processing apparatus incorporating the multi-processing system 100 is turned on (step S501: Yes), the clock frequency, the power source voltage, and the substrate potential of each processor chip 110 are initialized (step S502). The initial values are: a nominal clock frequency corresponding to the type of each processor chip 110 stored in and acquired from the processor-type storing circuit 112; a power source voltage corresponding to the nominal clock frequency; and a substrate potential corresponding to the nominal clock frequency.

At step S502, the required system performance of the multi-processing system 100 is also initialized. Without any designation by the user or the host system, the information processing apparatus is started up with the initial value of the required system performance.

After the initialization of step S502, it is judged whether or not any reset signal is received by the reset transmitting/receiving circuit 132 (step S503). When a reset signal is received (step S503: Yes), it is judged whether or not the chip ID and the lot-to-lot variation ("Fast", "Typical", "Slow", etc.) are received from each processor chip 110 (step S504). When the above information is received (step S504: Yes), it is judged whether or not the required chip performance of each processor chip 110 is received from the distributed processing control chip 120 (step S505). When the required chip performance is received (step S505: Yes), a chip performance calculation process for the processor chips 110 is executed (step S506), the details of which will be described later.

After the calculation of step S506, it is judged whether or not the system performance, which is the total of the chip performance of the processor chips 110, is equal to or higher than the required system performance (step S507). When the system performance is lower than the required system performance (step S507: No), a message for suggesting the user to add or replace the processor chip 110 is output (step S509), and the procedure is returned to step S503.

When the system performance is equal to or higher than the required system performance (step S507: Yes), it is judged whether or not the system performance is within M (1<M) times as high as the required system performance (step S508). The processing of step S508 is an optimization process from the viewpoint of power consumption. When a higher processing speed is required regardless of power consumption, the value of "M" may be set large such that processing may be executed at a speed as high as possible.

When the system performance is not within M times as high as the required system performance (step S508: No), the user is suggested to change the required chip performance of the processor chips 110 (step S511), and the procedure is returned to step S505.

When the system performance is within M times as high as the required system performance (step S508: Yes), a selected clock frequency, a power source voltage, and a substrate potential corresponding to the chip performance calculated at step S506 are set (step S510). After the setting of step S510, the reset state is released and the multi-processing system 100, in which the optimal processing distribution is realized by the selected clock frequency of each processor chip 110, is started up (step S512).

Figure 7:
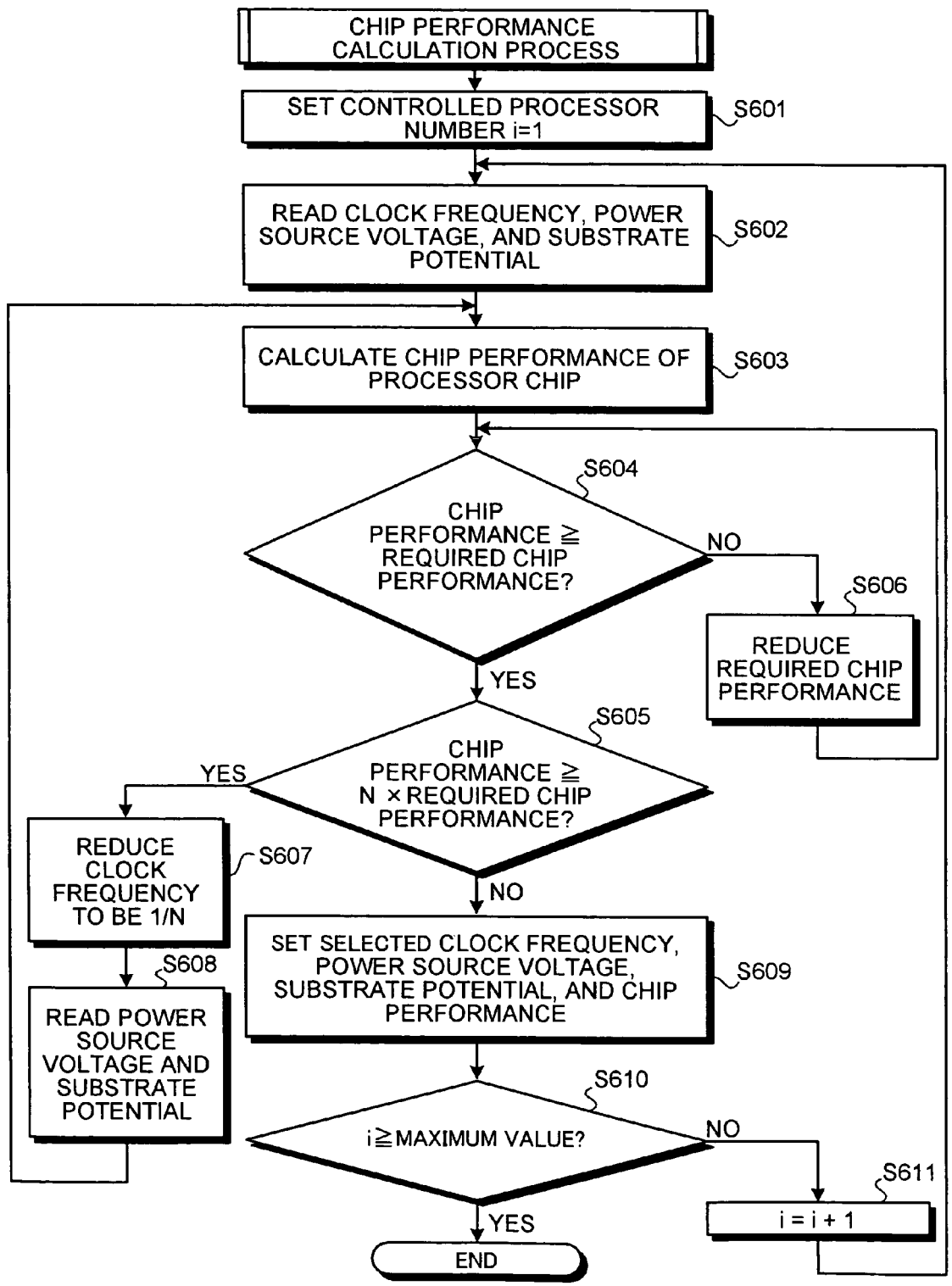
FIG. 7 is a flowchart of a chip performance calculation process at step S506 of FIG. 6.

FIG. 7 is a flowchart of a chip performance calculation process at step S506 of FIG. 6. A controlled processor number "i", which is an identifier of the processor chip 110 in the multi-processing system 100, is set at one (step S601). In the multi-processing system 100 shown in FIG. 2, "i=1" indicates the processor chip 110A and "i=2" indicates the processor chip 110B.

The clock frequency, the power source voltage, and the substrate potential of the processor chip 110A are read from the table storing unit 133 (step S602) to calculate the chip performance corresponding to the read clock frequency (step S603). Then, it is judged whether or not the calculated chip performance is equal to or higher than the required chip performance of the processor chip 110A (step S604). When the chip performance is lower than the required chip performance (step S604: No), the required chip performance of the processor chip 110A is reduced (step S606), and the procedure is returned to step S604.

When the chip performance is equal to or higher than the required chip performance (step S604: Yes), it is judged whether or not the chip performance is equal to or higher than N times as high as the required chip performance (step S605).

When the chip performance is equal to or higher than N times as high as the required chip performance (step S605: Yes), the chip performance is higher than necessary and the power consumption is large. Therefore, the selected clock frequency is reduced to be 1/N (step S607), and the power source voltage and the substrate potential corresponding to the reduced clock frequency are read from the table storing unit 133 (step S608). After the processing of steps S608 and S609, the procedure is returned to step S603.

When the chip performance is less than N times as high as the required chip performance (step S605: No), the selected clock frequency, the power source voltage, the substrate potential, the chip performance are set (step S609).

Finally, it is judged whether or not the calculation for all of the processor chips 110 has been completed (step S610). More specifically, it is judged whether or not the controlled processor number i reached the maximum value. When the calculation for all of the processor chips 110 has been completed (step S610: Yes), the procedure is returned to step S507 of FIG. 6. By repeating the above processing, a clock frequency, a power source voltage, and a substrate potential can be set which optimize the chip performance to be in the range from one time to N times as high as the required chip performance.

When the calculation for all of the processor chips 110 has not been completed (step S610: No), the controlled processor number i is incremented (step S611), and the procedure is returned to step S602 to execute the above processing for other processor chips 110.

When the required chip performance is initially set at 2 Pv for the processor chips 110A and 110B operating at actual clock frequencies of 2 GHz and 1 GHz (see FIG. 3), respectively, the processor chip 110B cannot achieve the required chip performance (2Pv) because the chip performance thereof is 1 Pv. Therefore, a request is output from the operation condition control chip 130 to the distributed processing control chip 120 to reduce the required chip performance of the processor chip 110B to be 1 Pv, thereby making the ratio of the required chip performance between the processor chips 110A and 110B to 2:1.

When the required system performance is 2 Pv, the required chip performance of the processor chip 110A is 4/3 Pv and the required chip performance of the processor chip 110B is 2/3 Pv. Thus, the processor chips 110A and 110B having the same nominal clock frequency (for example, 1 GHz as shown in FIG. 3) can operate at different clock frequencies (for example, 2 GHz and 1 GHz as shown in FIG. 3).

FIG. 8 is a flowchart of an addition or replacement process of the processor chips according to the present invention. The addition or replacement takes place after the processings shown in FIGS. 6 and 7 have been completed. First, it is judged whether or not a request for addition/replacement of the processor chip 110 is received from the distributed processing control chip 120 (step S701). When the request is received (step S701: Yes), the controlled processor number i is set at one (step S702).

After the setting of i at step S702, it is judged whether or not the chip ID is received from the i-th processor chip 110 (step S703). When the chip ID is received (step S703: Yes), it is judged whether or not the currently-received chip ID matches the previously-received chip ID (step S704).

When the chip IDs match each other (step S704: Yes), no addition/replacement of the i-th processor chip 110 has been made. In this case, it is judged whether or not the check on all of the processor chips 110 has been completed (step S705). When the check on all of the processor chips 110 has been completed (step S705: Yes), the series of processing steps are ended. When the check on all of the processor chips 110 has not been completed (step S705: No), the controlled processor number i is incremented (step S706) and the procedure is returned to step S703 to check a new i-th processor chip 110.

When the chip IDs do not match (step S704: No), the i-th processor chip 110 has been added or replaced. Therefore, the chip ID of the i-th processor chip 110 is updated from the previously-received one to the currently-received one (step S707).

After the processing of step S707, a signal indicating the addition or replacement of the processor chip 110 is transmitted from the multi-processing control circuit 134 to the processing distribution control circuit 121 (step S708). The chip performance calculation process shown in FIG. 7 is executed based on the actual clock frequency of the i-th processor chip 110 (step S709). The added or replaced processor chip 110 is started up (step S710) and the series of processing steps are ended.

Thus, a change (more specifically, addition or replacement) of the processor chips 110 can be automatically detected without stopping the operation of other processor chips 110. A selected clock frequency can be set, and the power source voltage and the substrate potential corresponding to the selected clock frequency can be set such that the processor chips 110 after the addition or replacement can operate with the optimal chip performance.

FIG. 9 is a flowchart of an optimization process executed when the required chip performance of an arbitrary processor chip is changed after the optimization process shown in FIG. 6. It is judged whether or not a change request for required performance is received from the user by the processing distribution controlling circuit 121 (step S801). When the request is received (step S801: Yes), the chip performance of each processor chip 110 is calculated (step S802). More specifically, similar to steps S602 and S603 of FIG. 7, one of the lot-to-lot variation vs. clock frequency tables corresponding to the current temperature is selected, and a clock frequency, a power source voltage, and a substrate potential are read to calculate the chip performance.

After the calculation of step S802, it is judged whether or not new required chip performance is received from the user (step S803). When the required chip performance is received (step S803: Yes), it is judged whether or not the chip performance calculated at step S802 is equal to or higher than the required chip performance received at step S803 (step S804).

When the chip performance is equal to or higher than the required chip performance (step S804: Yes), it is further judged whether or not the chip performance is equal to or higher than N times as high as the required chip performance (step S805).

When the chip performance is equal to or higher than N times as high as the required chip performance (step S805: Yes), the chip performance is higher than necessary. Therefore, the selected clock frequency is reduced to be 1/N (step S806), and the power source voltage and the substrate potential corresponding to the reduced clock frequency are read again from the table storing unit 133 (step S807). Then the procedure is returned to step S802, and the chip performance of each processor chip 110 is reviewed again.

When the chip performance is lower than the required chip performance (step S804: No), it is judged whether or not the current chip performance is the maximum (step S808). When the current chip performance is the maximum (step S808: Yes), the user is suggested to change the required chip performance because the processor chip 110 can not be started with the required chip performance (step S809), and the series of processing steps are ended.

When the current chip performance is not the maximum (step S808: No), the selected clock frequency is increased to the maximum, more specifically, the actual clock frequency (step S810). After a power source voltage and a substrate potential corresponding to the increased clock frequency are read again (step S811), the procedure is returned to step S802, and the review of the chip performance of each processor chip 110 is executed.

When the chip performance is less than N times as high as the required chip performance (step S805: No), the selected clock frequency, the power source voltage, the substrate potential corresponding to the chip performance calculated at step S702 are set (step S812). After the setting of step S812, the reset state is released and the processor chip 110 is started (step S813). Thus, the optimal processing distribution is executed at the selected clock frequency corresponding to the new chip performance.

As described above, even when the required chip performance is to be changed during the operation of the multi-processing system 100, the selected clock frequency can be automatically set again and can be adjusted to meet the new required chip performance. The power source voltage and the substrate potential can also be set again at the optimal value in response to the change of the selected clock frequency.

The multi-processing system 100 according to the embodiment of the present invention can apply to other forms of use in addition to the embodiments described above in which the chip performance of each processor chip 110 is set corresponding to the required system performance specified by the user or the host system.

For example, the maximum performance of the current multi-processing system 100 is calculated first and the calculation result is notified to the user or the host system. In this case, the values of "M" and "N" and the required system performance do not have to be specified, and the setting of the processor chips 110 can be made based on the informed calculation result. Therefore, even a novice user can easily set the optimum system performance in view of the performance of the processor chips 110.

According to the present invention, the optimization of the processing distribution to the processor chips 110 can be realized by extracting the processing performance of each of the processor chips to the maximum thereof.

Furthermore, because the actual clock frequency is detected corresponding to the lot-to-lot variation and the temperature of the processor chip 110, each of the processor chips 110 can be operated at a selected clock frequency faster than the nominal clock frequency. Moreover, the processing can be distributed throughout the entire multi-processing system 110 corresponding to the actual capacity of each of the processor chips 110, thereby improving the system performance of the processor chips 110 as a whole.

Furthermore, because the selected clock frequency can be set such that processing can be distributed suitably for the actual clock frequency of each of the processor chips 110, an excessively high clock frequency can not be set and reduction of the power consumption can be facilitated.

Furthermore, in the multi-processing system 100, the processor chips 110 can be operated with the optimal chip performance even when the configuration thereof has been changed due to a replacement of the processor chip 110 and the chip performance has been changed, which is inherent to multi-processing systems.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-processing system with a plurality of processor chips that includes at least a first processor chip and a second processor chip that have an identical nominal clock frequency and operates at a first clock frequency and a second clock frequency, respectively, the multi-processing system comprising:

an acquiring unit that acquires, from the first processor chip and the second processor chip, first information and second information on a first actual clock frequency of the first processor chip and a second actual clock frequency of the second processor chip, respectively, wherein the first actual clock frequency and the second actual clock frequency are different from each other and indicate a maximum performance of the first processor chip and the second processor chip when actually processing data, respectively;

a selecting unit that selects a first selected clock frequency and a second selected clock frequency based on the first information and the second information, respectively;

a chip performance calculating unit that calculates a first chip performance of the first processor chip operating at the first selected clock frequency and a second chip performance of the second processor chip operating at the second selected clock frequency, respectively;

a system performance judging unit that judges whether a total of chip performance of the processor chips is equal to or higher than a predetermined system performance required for the multi-processing system; and a setting unit that sets the first selected clock frequency and the second selected clock frequency as the first clock frequency and the second clock frequency, respectively, when the total is equal to or higher than the predetermined system performance.

2. The multi-processing system according to claim 1, further comprising:

a chip performance judging unit that judges whether the first chip performance is equal to or higher than a predetermined chip performance required for the first processor chip, wherein the system performance judging unit judges whether the total is equal to or higher than the predetermined system performance based on a judgment result of the chip performance judging unit.

3. The multi-processing system according to claim 2, further comprising:

a chip performance changing unit that reduces the predetermined chip performance by a predetermined amount when the first chip performance is lower than the predetermined chip performance, wherein the chip performance judging unit further judges whether the first chip performance is equal to or higher than the predetermined chip performance that has been reduced by the chip performance changing unit.

4. The multi-processing system according to claim 2, wherein the chip performance judging unit further judges, when the first chip performance is equal to or higher than the predetermined chip performance, whether the first chip performance is equal to or higher than N times as high as the predetermined chip performance, where N is a positive number larger than one.

5. The multi-processing system according to claim 4, further comprising:

a clock frequency changing unit that reduces, when the first chip performance is equal to or higher than N times as high as the predetermined chip performance, the first selected clock frequency to 1/N thereof, wherein the chip performance calculating unit calculates chip performance of the first processor chip operating at the first selected clock frequency that has been reduced to 1/N thereof by the clock frequency changing unit.

6. The multi-processing system according to claim 2, further comprising:

a receiving unit that receives new chip performance required for the first processor chip, wherein the chip performance judging unit judges whether the first chip performance is equal to or higher than the new chip performance.

7. The multi-processing system according to claim 6, further comprising:

a maximum performance judging unit that judges, when the first chip performance is lower than the new chip performance, whether the first chip performance is the maximum processing performance of the first processor chip based on the first information; and a judgment result outputting unit that outputs a judgment result of the maximum performance judging unit.

8. The multi-processing system according to claim 7, wherein the judgment result outputting unit outputs a message for suggesting a user to change the new chip performance when the first chip performance is the maximum processing performance.

9. The multi-processing system according to claim 8, wherein
the selecting unit selects, when the first chip performance is not the maximum processing performance, a maximum clock frequency corresponding to the maximum processing performance as the first selected clock frequency; and
the chip performance calculating unit calculates chip performance of the first processor chip operating at the maximum clock frequency.

10. The multi-processing system according to claim 1, further comprising:
an addition/replacement message outputting unit that outputs, when the total is lower than the predetermined system performance, a message that suggests an addition or replacement of processor chip to a user, wherein
the acquiring unit acquires information on an actual clock frequency of a new processor chip that has been added or replaced in response to the message.

11. The multi-processing system according to claim 1, wherein the system performance judging unit further judges, when the total is equal to or higher than the predetermined system performance, whether the total is within M times as high as the predetermined system performance, where M is a positive number larger than one.

12. The multi-processing system according to claim 11, further comprising:
a chip performance changing unit that reduces the predetermined chip performance by a predetermined amount when the total is not within M times as high as the predetermined system performance, wherein
the chip performance judging unit judges whether the first chip performance is equal to or higher than the predetermined chip performance that has been reduced by the chip performance changing unit.

13. The multi-processing system according to claim 1, further comprising:
a detecting unit that detects whether the first processor chip has been replaced with a new processor chip, wherein
the acquiring unit acquires information on an actual clock frequency of the new chip processor when a replacement has been detected by the detecting unit.

* * * * *